United States Patent [19]

Kablaoui et al.

[11] 3,873,623

[45] Mar. 25, 1975

[54] PREPARATION OF ALPHA-NITROKETONES

[75] Inventors: Mahmoud S. Kablaoui, Wappingers Falls; Donald R. Lachowicz, Fishkill, both of N.Y.

[73] Assignee: Texaco Inc., New York, N.Y.

[22] Filed: Dec. 8, 1971

[21] Appl. No.: 206,198

[52] U.S. Cl.............. 260/597 R, 260/590, 260/592
[51] Int. Cl............................................. C07c 45/02
[58] Field of Search................. 260/597 R, 590, 592

[56] References Cited
UNITED STATES PATENTS
3,458,582   7/1969   Lachowicz et al............. 260/597 R

OTHER PUBLICATIONS

R. T. Morrison, R. N. Boyd, Organic Chemistry, 2nd Edition, p. 492.

Primary Examiner—Leon Zitver
Assistant Examiner—James H. Reamer
Attorney, Agent, or Firm—Thomas H. Whaley; Carl G. Ries

[57] ABSTRACT

A method of preparing alpha-nitroketones by simultaneously contacting a solution of an alkene, a denitrating agent and an organic solvent with a mixture of dinitrogen tetroxide and oxygen, the mole ratio of denitrating agent to alkene being above 0.1:1 and up to about 2:1, preferably about 0.5:1 and 1:1 as a one step nitrooxidation reaction. The alpha-nitroketones so prepared are useful as fuel and lubricant additives as well as intermediates in the preparation of amides, acids, and nitroalkanes.

16 Claims, No Drawings

PREPARATION OF ALPHA-NITROKETONES

BACKGROUND OF THE INVENTION

This invention relates to a method for preparing alpha-nitroketones from alkenes. In particular this invention relates to a method for preparing alpha-nitroketones from internal alkenes by means of a one step nitrooxidation reaction.

In the past, nitroketones were prepared by initially contacting an alkene with a mixture of dinitrogen tetroxide and oxygen to form a nitroperoxynitrate. Thereafter, the nitroperoxynitrate was contacted in a second stage with a denitrating agent as exemplified in U.S. Pat. No. 3,415,856. A disadvantage in the prior art was the requirement that a two stage reaction procedure be employed. Such a method involving a plurality of stages consequently gave rise to economic penalties and decreased the commercial attractiveness of the process.

It is therefore an object of this invention to provide a direct method for the preparation of alpha-nitroketones.

It is another object of this invention to provide a method for the preparation of alpha-nitroketones from internal alkenes by a one step nitrooxidation reaction.

Yet another object of this invention is to provide a method for the preparation of alpha-nitroketones in high yields.

Other objects and advantages will become apparent from a reading of the following detailed description and examples.

SUMMARY OF THE INVENTION

Broadly, this invention contemplates a method of preparing alpha-nitroketones which comprises simultaneously contacting a mixture of an alkene, said alkene corresponding to the formula:

where R and $R^1$ are alkyl groups having from 1 to 20 carbon atoms or aryl groups having from 6 to 20 carbon atoms, a denitrating agent and an aprotic organic solvent with dinitrogen tetroxide and oxygen, where the mole ratio of said denitrating agent to said alkene is above 0.1:1 and up to about 2:1, preferably 0.5:1 to 1:1, thereby forming alpha-nitroketones corresponding to the formulae:

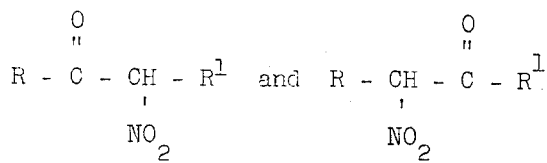

where R and $R^1$ are as heretofore defined. Combination of groups may be present as for example R may be alkyl and $R^1$ aryl.

Pursuant to this invention the contemplated alpha-nitroketones are derived from internal alkenes corresponding to the aforementioned formula and illustrated by 2-butene, 2-pentene, 2- and 3-hexene, 2- and 3-heptene, 2-,3- and 4-octene, 2-, 3- and 4-nonene, beta-methylstyrene, 2-,3-, 4- and 5-decene, 2-dodecene, diphenylethylene, 4-tetradecene, dibenzylethylene, 7-heptadecene and 10-eicosene. Mixtures of alkenes such as 3-decene and 4-decene, 4-dodecene and 5-dodecene, mixtures of internal tetradecenes, or mixtures of $C_{10}$ to $C_{14}$ or $C_{14}$ to $C_{18}$ alkenes are similarly contemplated.

The conversion of the above alkenes by the instant method to the corresponding alpha-nitroketones is accomplished by forming a solution composed of the alkene, a denitrating agent and an aprotic organic solvent and contacting the solution with a mixture of dinitrogen tetroxide and oxygen at a temperature between about 0° to 40°C., preferably from 10° to 20°C. Temperatures in excess of 40°C. are undesirable because of the threat of explosion and temperatures below 0°C. require excessive refrigeration thereby rendering the process economically unattractive.

The alkene reactant employed in the instant process as mentioned above is one other than a 1-olefin and encompasses internal alkenes that can be derived from many sources including paraffin dehydrogenation, wax cracking and olefin polymerization. When internal alkenes are used, the yield of the internal alpha-nitroketone is essentially quantitative. Conversely, when terminal olefins, such as 1-hexene, 1-octene, 1-dodecene, etc., are employed in the instant method, the product comprises not only nitroketones but additionally substantial amounts of by-products such as nitronitrates and acyl isoxazolines. Consequently, the objectives and advantages of the instant method are realized when internal alkenes are used. The conversion of 1-alkenes is best conducted as a two stage process involving initially the conversion to the nitroperoxynitrate followed by a second stage where contacting with the denitrating agent converts the nitroperoxynitrate to the nitroketone.

The mole ratio of the individual components in the instant invention represents an important aspect insofar as providing an economical process leading to high yields of the desired product. Specifically, the mole ratio of internal alkene to oxygen to dinitrogen tetroxide in the single step nitrooxidation reaction is maintained between about 1:1:0.5 and 1:30:1.5. Unexpectedly it has been found that the presence of an aprotic organic solvent permits the mole ratio of denitrating agent to internal alkene during nitrooxidation to be maintained at levels heretofore considered inoperatively low. We have found that when conversion is conducted in the presence of the organic solvent, a significant economic benefit is realized in that lesser amounts of costly denitrating agent are needed, whereas in the absence of solvent amounts of denitrating agent several times that employed herein would be required to provide comparable results. Ratios of denitrating agent below that specified above are undesirable because of the formation of by-products and the presence of the denitrating agent in amounts exceeding specified results in excessive loses of agent, which loses may be reduced but not eliminated through the use of extensive separation and recovery procedures. The reaction time is generally between about ½ and 5 hours although longer and shorter periods may be employed depending on the amount and rate of addition dinitrogen tetroxide.

It will be appreciated that the nitrating agent, dinitrogen tetroxide, is an equilibrium mixture of dinitrogen tetroxide and nitrogen dioxide with the equilibrium driven essentially to 100 percent dinitrogen tetroxide at 0°C. and essentially 100 percent nitrogen dioxide at 140°C. The term dinitrogen tetroxide as used herein denotes the equilibrium mixtures as well as the pure $N_2O_4$ compound.

Oxygen employed in the instant invention may be in pure form or diluted with air or in admixture with inert gases such as nitrogen or argon.

In the practice of the instant invention the internal alkene and denitrating agent are admixed with an aprotic organic solvent having a boiling point between about 30° to 100°C. Protic solvents should be avoided in that their use results in the formation of mixtures composed of nitroketone, nitronitrate and nitroalcohol. The ratio of aprotic organic solvent to alkene employed can range from 2:1 to 20:1 parts by weight. By employing the specified solvent, an addition benefit is provided to the instant method in that nitroketone recovery from the reaction mixture is facilitated and may be accomplished by means of distillation and extraction. Illustrative of the solvents which can be utilized in the instant method we mention n-hexane, n-heptane, carbon tetrachloride, diethylether, benzene and petroleum ether. Thereafter, dinitrogen tetroxide is introduced to the solution containing the alkene, denitrating agent and solvent along with oxygen at the rate of between about 0.01 and 0.1 gram per minute per gram of alkene.

Among the denitrating agents contemplated in the instant invention are those selected from the group consisting of:

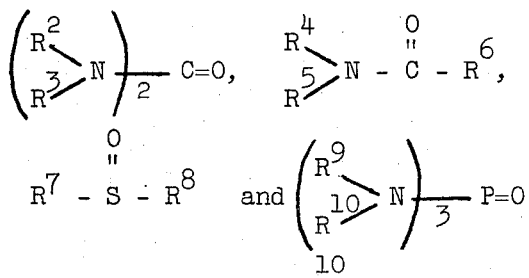

where $R^2$, $R^3$, $R^7$, $R^8$, $R^9$ and $R^{10}$ are alkyl of from 1 to 5 carbons and $R^4$, $R^5$ and $R^6$ are hydrogen or alkyl of from 1 to 5 carbons. Specific examples of denitrating agents contemplated herein are dimethyl formamide, diethyl formamide, dimethyl acetamide, dimethyl sulfoxide, diethyl sulfoxide, tetramethylurea and tetraethylurea. In addition other denitrating agents such as 1-methyl-2-pyrrolidinone can be used. Particularly preferred denitrating agents are dimethyl formamide, dimethyl sulfoxide and 1-methyl-2-pyrrolidinone.

Examples of the alpha-nitroketones prepared by the instant method include 2-nitro-3-butanone, 2-methyl-2-nitrobutanone, 2-nitro-3-pentanone, 3-nitro-2-pentanone, 3-nitro-2-hexanone, 3-nitro-4-hexanone, 3-nitro-4-heptanone, 4-nitro-3-heptanone, 5-nitro-4-octanone, 1-nitro-1-phenylpropanone, 2-nitro-1-phenylpropanone, 4-nitro-5-decanone, 5-nitro-4-dodecanone, 4-nitro-5-dodecanone, alpha-nitrobenzylphenlyketone, 1,4-diphenyl-3-nitro-2-butanone, 8-nitro-7-heptadecanone and 7-nitro-8-heptadecanone. The alpha-nitroketones so prepared are useful as fuel and lubricant additives. Further they are useful as intermediates in the preparation of amides, amines, acids and nitroalkanes.

In order to more fully illustrate the nature of our invention and the manner of practicing the same the following examples are presented.

EXAMPLE I

Into a 100 milliliter flask equipped with a condenser, gas inlet and thermometer there was charged 4.0 grams (0.018 mole) of 8-heptadecene, 1.3 grams (0.018 mole) of dimethyl formamide and 40 milliliters of carbon tetrachloride. To this solution maintained at a temperature of 10° to 15°C. there was introduced oxygen at the rate of 60 milliliters per minute and 1.76 grams (0.018 mole) of the dinitrogen tetroxide at the rate of 0.02 milliliter per minute over a period of ½ hour. At the end of the dinitrogen tetroxide - oxygen addition period, the carbon tetrachloride was removed from the reaction zone by distillation under a pressure of 20 to 100 mm/Hg. The residue was added to 100 milliliters of water and extracted four times with 50 milliliter portions of diethylether, thereafter dried over magnesium sulfate and the ether stripped by distillation under a pressure of 100 to 760 mm/Hg. The product, 5.04 grams, corresponding to a yield of 98 percent was determined by spectral analysis to be a mixture of 8-nitro-9-heptadecanone and 9-nitro-8-heptadecanone, No by-products were detected.

EXAMPLE II

Into a 200 milliliter flask equipped with a condenser, gas inlet and thermometer there was charged 11.2 grams (0.1 mole) of 4-octene, 7.3 grams (0.1 mole) of dimethyl formamide and 100 milliliters of carbon tetrachloride. To this solution maintained at 10°C. there was introduced oxygen at the rate of 60 milliliters per minute and 9.2 grams (0.1 mole) of dinitrogen tetroxide at the rate of 0.05 milliliter per minute over two hours. At the end of the dinitrogen tetroxide - oxygen addition period, the carbon tetrachloride was removed by distillation under a pressure of 20 to 100 mm/Hg. The residue was added to 100 milliliters of water and extracted four times with 50 milliliter portions of diethylether, thereafter dried over magnesium sulfate and the ether stripped by distillation under a pressure of 100 to 760 mm/Hg. The product, 15.6 grams, corresponding to a yield of 90 percent was determined by spectral analysis to be 5-nitro-4-octanone.

EXAMPLE III

To the apparatus of Example I, there was charged 5.0 grams (0.025 mole) of 1-tetradecene, 1.8 grams (0.025 mole) of dimethyl formamide and 50 milliliters of carbon tetrachloride. To this solution maintained at a temperature of 10°C. there was introduced oxygen at the rate of 60 milliliters per minute and 2.3 grams (0.025 mole) of dinitrogen tetroxide at the rate of 0.03 milliliter per minute over a period of ½ hour. At the end of the dinitrogen tetroxide - oxygen period, carbon tetrachloride was removed from the reaction zone by distillation under a pressure of 20 to 100 mm/Hg. The residue was added to 100 milliliters of water and extracted four times with 50 milliliter portions of diethylether, thereafter dried over magnesium sulfate and the ether stripped by distillation under a pressure of 100 to 760 mm/Hg. The product, 6.85 grams, was determined by analysis to be primarily 1-nitro-2-tetradecanone along with 1-nitro-2-tetradecylnitrate and 3-tetradecyloxy-5- dodecyl isoxazoline. The estimated yield of 1-nitro-2-tetradecanone was 80 percent.

EXAMPLE IV

Employing the apparatus and procedure of Example III, there was charged 19.6 grams (0.1 mole) of 1-tetradecene, 14.6 grams (0.2 mole) of dimethyl formamide and 9.2 grams (0.1 mole) of dinitrogen tetroxide. The same products were isolated as in Example III except that the yield of nitroketone was 10.3 grams (40 percent).

EXAMPLE V

Employing the apparatus and precedure of Example III, there was charged 11.2 grams (0.05 mole) of 1-hexadecene, 7.8 grams (0.1 mole) of dimethyl sulfoxide and 4.6 grams (0.05 mole) of dinitrogen tetroxide. There was recovered 10.0 grams of nitroketone corresponding to a yield of 70 percent.

We claim:

1. A method of preparing alpha-nitroketones which comprises simultaneously contacting a mixture of an alkene, said alkene corresponding to the formula:

$$R - CH = CH - R^1$$

where R and $R^1$ are alkyl groups having from 1 to 20 carbon atoms or aryl groups having from 6 to 20 carbon atoms, a denitrating agent selected from the group consisting of 2-pyrrolidinones,

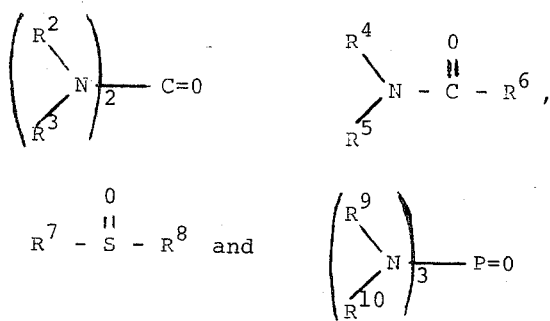

where $R^2$, $R^3$, $R^7$, $R^8$, $R^9$ and $R^{10}$ are alkyl of from 1 to 5 carbons and $R^4$, $R^5$ and $R^6$ are hydrogen or alkyl of from 1 to 5 carbon atoms and an aprotic organic solvent having a boiling point between about 30° to 100°C. with dinitrogen tetroxide and oxygen, where the mole ratio of said denitrating agent to said alkene is above 0.1:1 to about 2:1 thereby forming alpha-nitroketones corresponding to the formulae:

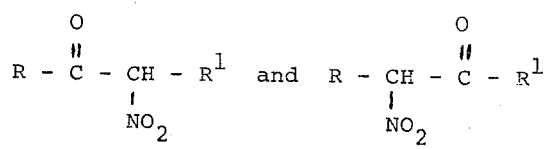

where R and $R^1$ are as heretofore defined.

2. A method according to claim 1 wherein said denitrating agent is dimethyl formamide.
3. A method according to claim 1 wherein said denitrating agent is dimethyl sulfoxide.
4. A method according to claim 1 wherein said denitrating agent is 1-methyl-2-pyrrolidinone.
5. A method according to claim 1 wherein said alkene is 4-octene.
6. A method according to claim 1 wherein said alkene is 4-tetradecene.
7. A method according to claim 1 wherein said alkene is 8-heptadecene.
8. A method according to claim 1 wherein said alkene is a mixture of internal tetradecenes.
9. A method according to claim 1 wherein said contacting is conducted at a temperature between about 0° to 40°C.
10. A method according to claim 1 wherein said contacting is conducted at a temperature of from 10° to 20°C.
11. A method according to claim 1 wherein the mole ratio of said denitrating agent to said alkene is about 0.5:1 to 1:1.
12. A method according to claim 1 wherein said alpha-nitroketone is 5-nitro-4-octanone.
13. A method according to claim 1 wherein said alpha-nitroketone is a mixture of internal nitrotetradecanones.
14. A method according to claim 1 wherein said alpha-nitroketone is 8-nitro-9-heptadecanone.
15. A method according to claim 1 wherein said solvent is carbon tetrachloride.
16. A method according to claim 1 wherein said solvent is benzene.

* * * * *